(12) United States Patent
Kim et al.

(10) Patent No.: US 9,136,520 B2
(45) Date of Patent: Sep. 15, 2015

(54) BATTERY MODULE

(75) Inventors: Sung-Bae Kim, Suwon-si (KR);
Yong-Sam Kim, Suwon-si (KR);
Dae-Won Han, Suwon-si (KR);
Sang-Won Byun, Suwon-si (KR);
Byung-Kyu Ahn, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 394 days.

(21) Appl. No.: 12/652,022

(22) Filed: Jan. 4, 2010

(65) Prior Publication Data

US 2010/0173178 A1    Jul. 8, 2010

(30) Foreign Application Priority Data

Jan. 6, 2009    (KR) ........................ 10-2009-0000790

(51) Int. Cl.
| | | |
|---|---|---|
| H01M 2/02 | (2006.01) | |
| H01M 2/20 | (2006.01) | |
| H01M 2/06 | (2006.01) | |
| H01M 2/30 | (2006.01) | |
| H01M 2/34 | (2006.01) | |

(52) U.S. Cl.
CPC .............. *H01M 2/206* (2013.01); *H01M 2/06* (2013.01); *H01M 2/305* (2013.01); *H01M 2/342* (2013.01); *H01M 2/0217* (2013.01); *H01M 2200/30* (2013.01)

(58) Field of Classification Search
USPC .................................................. 429/158, 160
See application file for complete search history.

(56) References Cited

U.S. PATENT DOCUMENTS

| | | | |
|---|---|---|---|
| 1,659,463 A | 2/1928 | Entz | |
| 4,291,106 A | 9/1981 | Hooke | |
| 4,317,497 A | 3/1982 | Alt et al. | |
| 4,693,948 A | 9/1987 | McEwan | |
| 6,340,877 B1 * | 1/2002 | Mita et al. | ..................... 320/112 |
| 7,270,576 B2 * | 9/2007 | Kim et al. | ..................... 439/627 |
| 7,776,467 B2 * | 8/2010 | Kato et al. | ..................... 429/160 |

(Continued)

FOREIGN PATENT DOCUMENTS

| | | |
|---|---|---|
| CN | 1770504 A | 5/2006 |
| CN | 2807484 Y | 8/2006 |

(Continued)

OTHER PUBLICATIONS

European Patent Office action dated Jan. 12, 2010, issued in EPO Application No. 09180829.5, citing US 4,291,106 A, 4 pages.

(Continued)

*Primary Examiner* — Ula C Ruddock
*Assistant Examiner* — Osei Amponsah
(74) *Attorney, Agent, or Firm* — Christie, Parker & Hale, LLP

(57) ABSTRACT

A battery module according to the present invention includes rechargeable batteries that include a first terminal and a second terminal which protrude outward, the first terminal including differentiation portions formed of an indentation or a protruding portion to differentiate the first terminal from the second terminal; and connection members that electrically connect the rechargeable batteries, fixed to the first and second terminals of adjacent rechargeable batteries, including verification portions which fit the differentiation portions so as to improve assemblability and minimize contact resistance.

15 Claims, 13 Drawing Sheets

(56) References Cited

U.S. PATENT DOCUMENTS

| | | | |
|---|---|---|---|
| 2003/0180582 A1* | 9/2003 | Masumoto et al. | 429/7 |
| 2006/0091855 A1* | 5/2006 | Seo | 320/116 |
| 2006/0115727 A1 | 6/2006 | Kim et al. | |
| 2006/0127759 A1 | 6/2006 | Bechtold et al. | |
| 2007/0141458 A1* | 6/2007 | Nagatani et al. | 429/158 |
| 2009/0305126 A1* | 12/2009 | Choi et al. | 429/159 |

FOREIGN PATENT DOCUMENTS

| | | | | |
|---|---|---|---|---|
| CN | 1971975 A | | 5/2007 | |
| CN | 1976095 A | | 6/2007 | |
| GB | 2 169 130 A | | 7/1986 | |
| JP | 2001-102041 | | 4/2001 | |
| JP | 2004-265840 | | 9/2004 | |
| JP | 2005-209366 | | 8/2005 | |
| JP | 2005-353547 | | 12/2005 | |
| JP | 2007-280831 | | 10/2007 | |
| JP | 2008-034318 | | 2/2008 | |
| JP | 2008-091183 | | 4/2008 | |
| JP | 2008-270033 | * | 11/2008 | H01M 2/20 |
| KR | 10-0560514 | | 3/2006 | |
| KR | 10-2006-0061487 | | 6/2006 | |
| KR | 10-0649568 B1 | | 11/2006 | |
| KR | 100649568 | * | 11/2006 | H01M 2/04 |
| WO | WO2007004335 | * | 1/2007 | H01M 2/24 |

OTHER PUBLICATIONS

Korean Office action dated Jul. 23, 2010 issued by the Korean Patent Office for corresponding Korean Patent Application No. 10-2009-0000790, listing the cited references in the IDS.

KIPO Notice of Allowance dated Jan. 21, 2011, for Korean priority Patent application 10-2009-0000790, noting listed reference in this IDS, as well as references previously file in an IDS dated Aug. 25, 2010.

European Search Report dated Mar. 15, 2010, for corresponding European application 09180829.5, noting listed references in this IDS.

SIPO Office action dated Jun. 26, 2012, for corresponding Chinese Patent application 201010003006.6, with English translation, (14 pages).

Japanese Office action dated Oct. 23, 2012 issued in corresponding Japanese application No. 2010-000159, 2 pages.

SIPO Office action dated Aug. 16, 2013, with English translation, for corresponding Chinese Patent application 201010003006.6, (16 pages).

SIPO Second Office Action, dated Mar. 16, 2013, for Chinese Application No. 201010003006.6, with English translation, 16 pages.

SIPO Office action dated Jan. 24, 2014, with English translation, for corresponding Chinese Patent application 201010003006.6, (13 pages).

* cited by examiner

BATTERY MODULE

CROSS-REFERENCE TO RELATED APPLICATION

This application claims priority to and the benefit of Korean Patent Application No. 10-2009-0000790 filed in the Korean Intellectual Property Office on Jan. 6, 2009, the entire content of which is incorporated herein by reference.

BACKGROUND OF THE INVENTION

1. Field of the Invention

The present invention relates to a battery module having an improved structure in which rechargeable batteries are electrically connected to each other.

2. Description of the Related Art

Rechargeable batteries can be repeatedly charged and discharged unlike primary batteries which cannot be repeatedly charged. Low-capacity rechargeable batteries are used for portable compact electronic apparatuses such as mobile phones or notebook computers and camcorders and high-capacity rechargeable batteries are widely used as a power supply for driving a motor of a hybrid vehicle, etc.

Recently, a high-output rechargeable battery using a non-aqueous electrolyte having high energy density has been developed. The high-output rechargeable battery is configured with a high-capacity rechargeable battery by connecting a plurality of rechargeable batteries in series so as to be used for driving a motor for an apparatus requiring a large amount of power, i.e., an electrical vehicle, etc.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a rechargeable battery and a battery module that are resistant to vibration and shock and are efficiently assembled.

According to an exemplary embodiment of the present invention, a battery module includes rechargeable batteries that include a first terminal and a second terminal which protrude outward, the first terminal including differentiation portions formed of an indentation or a protruding portion to distinguish the first terminal from the second terminal. The connection members that electrically connect the rechargeable batteries are fixed to the first and second terminals of adjacent rechargeable batteries, and include verification portions which fit in the differentiation portions.

The first and second terminals may have a plate shape. The rechargeable battery may include an electrode assembly that includes a positive electrode, a negative electrode, and a separator disposed between the positive electrode and the negative electrode. The battery may also include a case in which the electrode assembly is contained, a cap plate that is joined to an opening of the case, and a rivet that fixes the first terminal or the second terminal to the cap plate.

The rechargeable battery may further include a lead member that electrically connects the first terminal or the second terminal with the electrode assembly. The lead member may be fixed to the cap plate by the rivet together with the first terminal or the second terminal.

The first terminal may include a differentiation portion including an indentation or a protruding portion which is not formed in the second terminal. The first and second terminals may have a plate shape. The connection member may be fixed to the first terminal and the second terminal of adjacent rechargeable batteries by welding.

The connection member may have a contact protrusion on a surface facing the first terminal or the second terminal, and may be joined at the contact protrusion by welding. The first terminal may have a differentiation portion formed of a first indentation, the second terminal may have a second indentation, and the first indentation may have a position or a shape different from the second indentation.

The first terminal may have a differentiation portion including a first protruding portion, the second terminal may have a second protruding portion, and the first protruding portion may have a position or a shape different from the second protruding portion. The first terminal may have a protruding portion, the second terminal may have an indentation, and verification portions may fit the protruding portion and the indentation.

The first terminal may have differentiation portions including first protruding portions, the second terminal may have the second protruding portions, and a distance between the first protruding portions may be different from a distance between the second protruding portions. The connection member may have indication portions that indicate positions or shapes of the verification portions on a surface opposite to a surface where the verification portion is formed.

The indication portion may be formed of a protrusion, a groove, a pattern, a symbol, or a character. The indication portion may have the same shape as the differentiation portion or the verification portion.

The connection member may be joined onto the tops of the first and second terminals of the adjacent rechargeable batteries by welding. The differentiation portion formed of the first protruding portion may be located at the top of the first terminal and the second protruding portion having the shape different from the first protruding portion may be located at the top of the second terminal. The connection member may have a verification portion formed of connection grooves in which the first protruding portion and the second protruding portion fit. The first protruding portion and the verification portion may be joined to each other by welding.

Another embodiment of the present invention provides a battery module that includes a rechargeable battery that includes a case in which an electrode assembly generating electricity is incorporated; a cap plate that is joined to an opening of the case; and first and second terminals that protrude outward from the cap plate. The first battery may include a first terminal insulating member that is disposed between the first terminal and the cap plate to insulate the cap plate and the first terminal from each other. The first terminal insulating member may have a differentiation portion formed of an indentation or a protruding portion. The battery may also include a second terminal insulating member that is disposed between the second terminal and the cap plate to insulate the cap plate and the second terminal from each other. Connection members are fixed to the first terminal and the second terminal of the adjacent rechargeable batteries to electrically connect the rechargeable batteries. The connection members have verification portions which fit the differentiation portions.

The first and second terminals may have a plate shape. The first terminal insulating member may be wider than the first terminal, having a top portion which extends outward from the first terminal, and the differentiation portion may be formed on the top portion.

The first terminal insulating member may have a differentiation portion formed of a first protruding portion, the second terminal insulating member may have a second protruding portion, and the first protruding portion may have a forming position or a shape different from the second protruding portion. The differentiation portion may be formed of the protruding portion or the indentation portion which is not formed in the second terminal insulating member.

Positions and shapes of indentations formed in a first terminal and a second terminal are different from each other and a protruding portion is formed only in the first terminal, such that it is possible to easily differentiate a positive terminal and a negative terminal from each other.

Further, the battery module according to the present exemplary embodiment can improve assemblability and prevent contact resistance between the connection member and the terminals from being increased due to external vibration or shock by fixing the connection member to the terminals by welding.

In addition, verification portions fit in differentiation portions formed of an indentation or a protruding portion, such that the verification portions support the connection member, thereby preventing the connection member from being wobbled at the terminals. Accordingly, the contact resistance decreases, such that the output of the battery module is improved and the lifespan of the rechargeable battery is extended.

DESCRIPTION OF REFERENCE NUMERALS INDICATING PRIMARY ELEMENTS IN THE DRAWINGS

Figure 1:
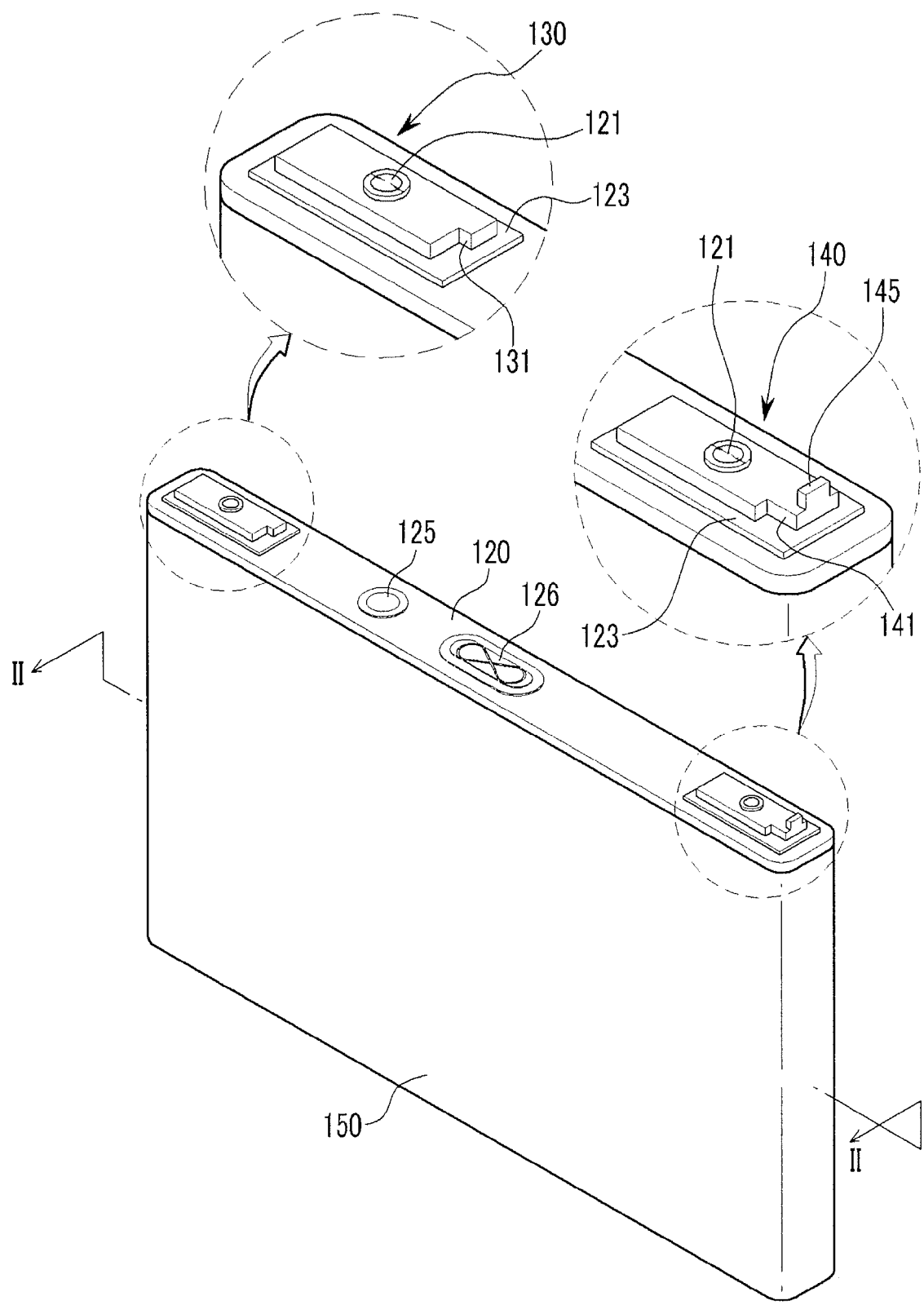
FIG. 1 is a perspective view of a rechargeable battery according to a first exemplary embodiment of the present invention.

| 100: | Rechargeable battery | 120: | Cap plate |
|---|---|---|---|
| 121: | Rivet | 140: | First terminal |
| 130: | Second terminal | 131, 141: | Indentation |
| 145: | Protruding portion | 150: | Case |
| 160: | Connection member | 162: | Connection groove |
| 163, 167: | Connection protrusion | 164: | Contact protrusion |
| 364, 363: | Indication portion | 900: | Battery module |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In addition, like reference numerals denote like elements in the specification and the accompanying drawings.

One high-capacity rechargeable battery is generally made of a plurality of rechargeable batteries that are connected to each other in series. The rechargeable batteries may have a cylindrical shape, a prismatic shape, etc.

The prismatic-shaped rechargeable battery may include an electrode assembly that has a positive electrode and a negative electrode with a separator interposed therebetween. It also includes a case having a space incorporating the electrode assembly and a cap plate that seals the case. The cap plate has a terminal hole into which an electrode terminal is inserted. In such a battery the electrode terminal is electrically connected to the electrode assembly and inserted into the terminal hole, so that the terminal protrudes outside of the case.

The electrode terminal may be fixed to the cap plate by a nut. The nut may be released by external continuous vibration or shock. Such a problem causes contact resistance inside of the rechargeable battery, thereby deteriorating the output of the rechargeable battery and decreasing the lifespan of the rechargeable battery.

The rechargeable batteries may be electrically connected with each other by a connection plate to constitute a battery module. The electrode terminal may be fixed to the cap plate by a nut coupled to an upper portion of the electrode terminal, the connection plate may be joined onto the electrode terminal, and another nut may couple the connection plate to the electrode terminal, such that the connection plate and the electrode terminal may be electrically connected with each other.

However, a structure of fixing the connection plate with the nut may be vulnerable to external vibration or shock. That is, when the nut is released by the vibration or shock, an electrical connection between the electrode terminal and the connection plate may be deteriorated.

In particular, when the rechargeable battery or the battery module is installed in an apparatus such as an electric vehicle or a hybrid vehicle, which receives continuous vibration, such a problem may further occur.

In order to solve the above-mentioned problem, a structure in which the terminal has a plate shape and the connection plate is fixed to the terminal by welding is proposed. However, the structure of fixing the connection plate to the terminal by welding may be difficult to disassemble after being once fixed.

In particular, when positive electrodes and negative electrodes of adjacent rechargeable batteries are connected with each other in series, it may be difficult to differentiate the positive terminal and the negative terminal from each other, such that considerable difficulties may occur in the assembling process.

Figure 2:
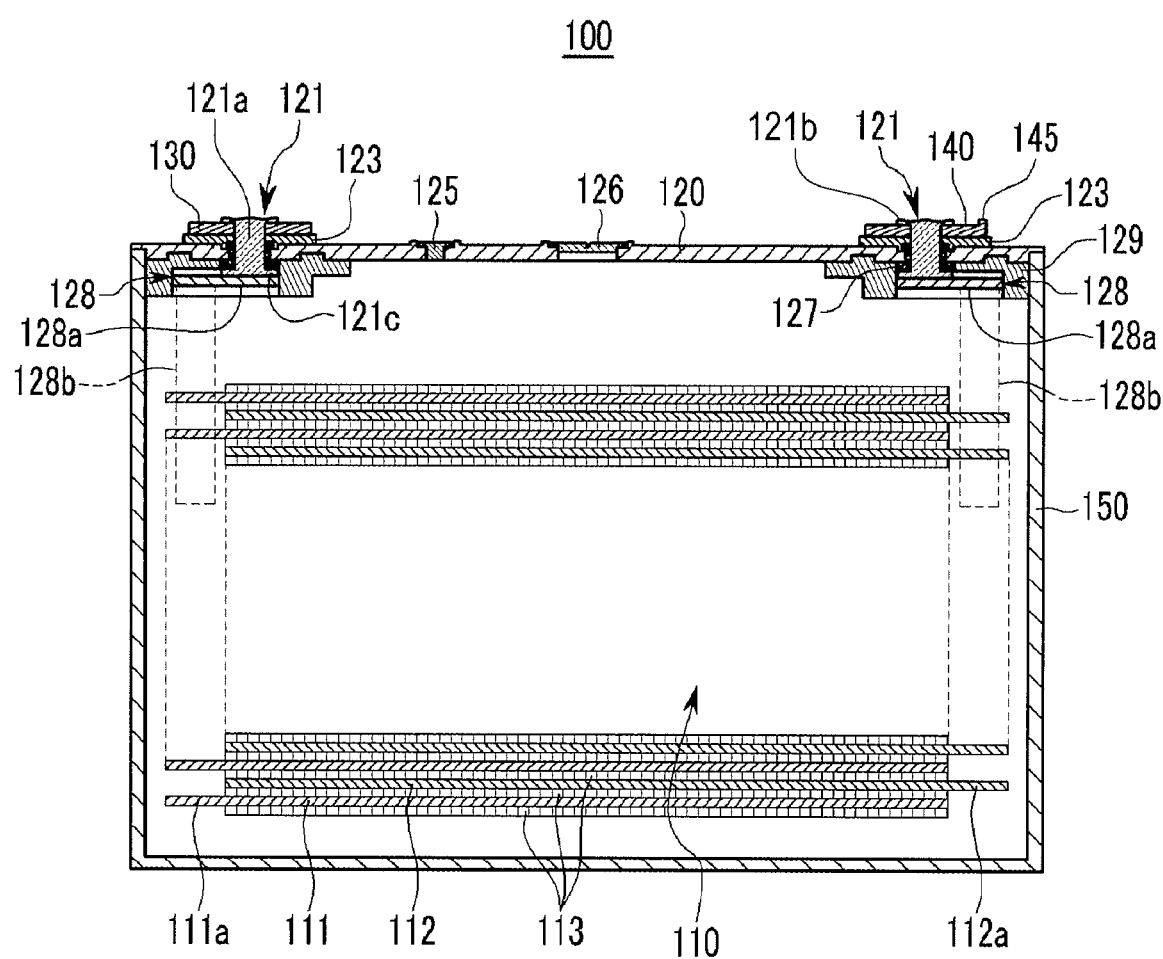
FIG. 2 is a cross-sectional view taken along the line II-II of FIG. 1.

FIG. 1 is a perspective view of a rechargeable battery according to a first exemplary embodiment of the present invention. FIG. 2 is a longitudinal cross-sectional view of a rechargeable battery taken along the line II-II of FIG. 1.

Referring to FIGS. 1 and 2, the rechargeable battery 100 includes an electrode assembly 110 wound with a separator 113, which is an insulator, interposed between a positive electrode 111 and a negative electrode 112, a case 150 in which the electrode assembly 110 is contained, a first terminal 140 and a second terminal 130 that are electrically connected with the electrode assembly 110, and a cap plate 120 that is joined to an opening formed in the case 150.

The positive electrode 111 and the negative electrode 112 include a coated region where a current collector formed of a thin metal foil is coated with an active material and uncoated portions 111a and 112a where the current collector is not coated with the active material. The uncoated portions 111a and 112a are formed at side ends of the positive electrode 111 and the negative electrode 112 in longitudinal directions of the positive electrode 111 and the negative electrode 112. In addition, the positive electrode 111 and the negative electrode 112 are wound with the separator 113, which is the insulator, interposed therebetween to form the electrode assembly 110 having a jelly-roll shape.

The first terminal 140 and the second terminal 130 are electrically connected to the uncoated portions 111a and 112a, respectively, of the electrode assembly 110, via a lead member 128. A lower insulating member 129 for insulation is installed between the lead member 128 and the cap plate 120.

The first terminal 140 is electrically connected with the negative electrode uncoated portion 112a to constitute a negative terminal and the second terminal 130 is electrically connected with the positive electrode uncoated portion 111a to constitute a positive terminal. In the present exemplary embodiment, the first terminal 140 serves as the negative terminal and the second terminal 130 serves as the positive terminal, but the present invention is not limited thereto and the first terminal 140 may serve as the positive terminal and the second terminal 130 may serve as the negative terminal.

The case 150 has a space therein and is formed of a prismatic type case having a hexahedral shape, of which one surface is opened. However, the present invention is not limited thereto and the case may have various shapes such as a cylindrical shape, etc.

The cap plate 120 is formed of a thin plate. A vent portion 126 that has a notch to be openable depending on a set internal pressure and a plug 125 that seals an electrolyte solution inlet are installed in the cap plate 120.

The first and second terminals 140 and 130 have a plate shape. The first and second terminals 140 and 130 are disposed parallel to the cap plate 120. Further, the first and second terminals 140 and 130 are fixed to the cap plate 120 by using a rivet 121. The rivet 121 includes a pole portion 121a that passes through the cap plate 120 and head portions 121b and 121c that protrudes outward at an upper and lower ends of the pole portion 121a to support the pole portion 121a to be fixed to the cap.

The lead member 128 is fixed onto the bottom of the head portion 121c that is positioned at a lower end of the rivet 121 by welding. The lead member 128 includes an upper plate 128a that is fixed to the rivet 121 by welding and an attachment plate 128b that protrudes downward from the upper plate 128a and is fixed to the uncoated portions 111a or 112a.

In the embodiments of the present invention, the upper plate 128a is fixed to the head portion 121c of the rivet 121 by welding, but the present invention is not limited thereto and the lead member 128 may be fixed to the cap plate 120 by the rivet 121 together with the terminals 130 and 140. In this case, a hole through which the rivet 121 passes is formed in the upper plate 128a, the pole portion 121a passes through the upper plate 128a, and the head portion 121c is positioned below the upper plate 128a to press the upper plate 128a toward the cap plate 120.

A terminal insulating member 123 and a lower gasket 127 are interposed between the cap plate 120 and the terminals 130 and 140 to insulate the cap plate 120 and the terminals 130 and 140.

The lower gasket 127 fits in a terminal hole and the terminal insulating member 123 is installed between the cap plate 120 and the terminals 130 and 140. The terminal insulating member 123 is wider than the terminals 130 and 140. A hole through which the rivet 121 passes is formed at the center of the terminal insulating member 123.

The terminals 130 and 140 of the rechargeable battery 100 according to the embodiments of the present invention are fixed to the cap plate 120 by the rivet 121, such that the terminals 130 and 140 are resistant to vibration, in comparison with conventional structures which fix the terminals to the cap plate by using a nut.

After the rivet 121 is installed through the terminal 130 or 140 and the cap plate 120, the rivet 121 is pressed by strong pressure at upper and lower portions thereof. At this time, the head portions 121b and 121c are formed at respective ends of the rivet 121. During such a pressing process, the terminals 130 and 140 are closely contacted to the cap plate 120, thereby preventing the terminals 130 and 140 from being released due to vibrations.

Further, when the rivet 121 is pressed with the lead member 128, the lead member 128 is also fixed to the cap plate 120 at the same time, thereby preventing contact resistance from being generated due to external vibration. Therefore, a total output of the rechargeable battery 100 is improved. In the case of the rechargeable battery 100, it is desirable to reduce contact resistance. The contact resistance decreases the output of the rechargeable battery 100 and increases the temperature of the rechargeable battery 100 by generating resistance heat. When the temperature of the rechargeable battery 100 increases, an abnormal reaction occurs inside of the rechargeable battery 100, such that the lifespan of the rechargeable battery 100 is shortened. However, according to embodiments of the present invention, since the rivet 121 is not influenced by vibrations that much, it is possible to reduce or minimize contact resistance.

As shown in FIG. 1, the first and second terminals 140 and 130 have a substantially rectangular plate shape. The rectangular shape generally has a short side having the comparatively shorter length and a long side having a longer length than the short side.

The first terminal 140 has a differentiation portion that includes a first indentation 141 formed at the long side and a protruding portion 145 formed in the short side adjacent to the first indentation 141.

The first indentation 141 is formed of a groove that is configured by cutting an edge of the long side, and the groove extends in an extending direction of the long side. Further, the protruding portion 145 is formed of a protrusion that protrudes at an edge of the short side and the protrusion extends upwardly away from the first terminal 140. The first indentation 141 and the protruding portion 145 that constitute the differentiation portion serve to differentiate the first terminal from the second terminal.

Further, the second terminal 130 has a second indentation 131 at the short side. The second indentation 131 is formed of a groove that is configured by cutting the edge of the short side and the groove extends in an extending direction of the short side.

As described above, in the case of the rechargeable battery 100 according to embodiments of the present invention, positions and shapes of the indentations 131 and 141 formed in the terminals 130 and 140 are different from each other. Further, the protruding portion 145 is formed in the first terminal 140, while the protruding portion is not formed in the second terminal 130. As such, when the positions and shapes of the indentations 131 and 141 formed in the first and second terminals 140 and 130 are different from each other or the protruding portion 145 is formed only in the first terminal 140, it is possible to easily differentiate a positive terminal and a negative terminal from each other.

Figure 3:
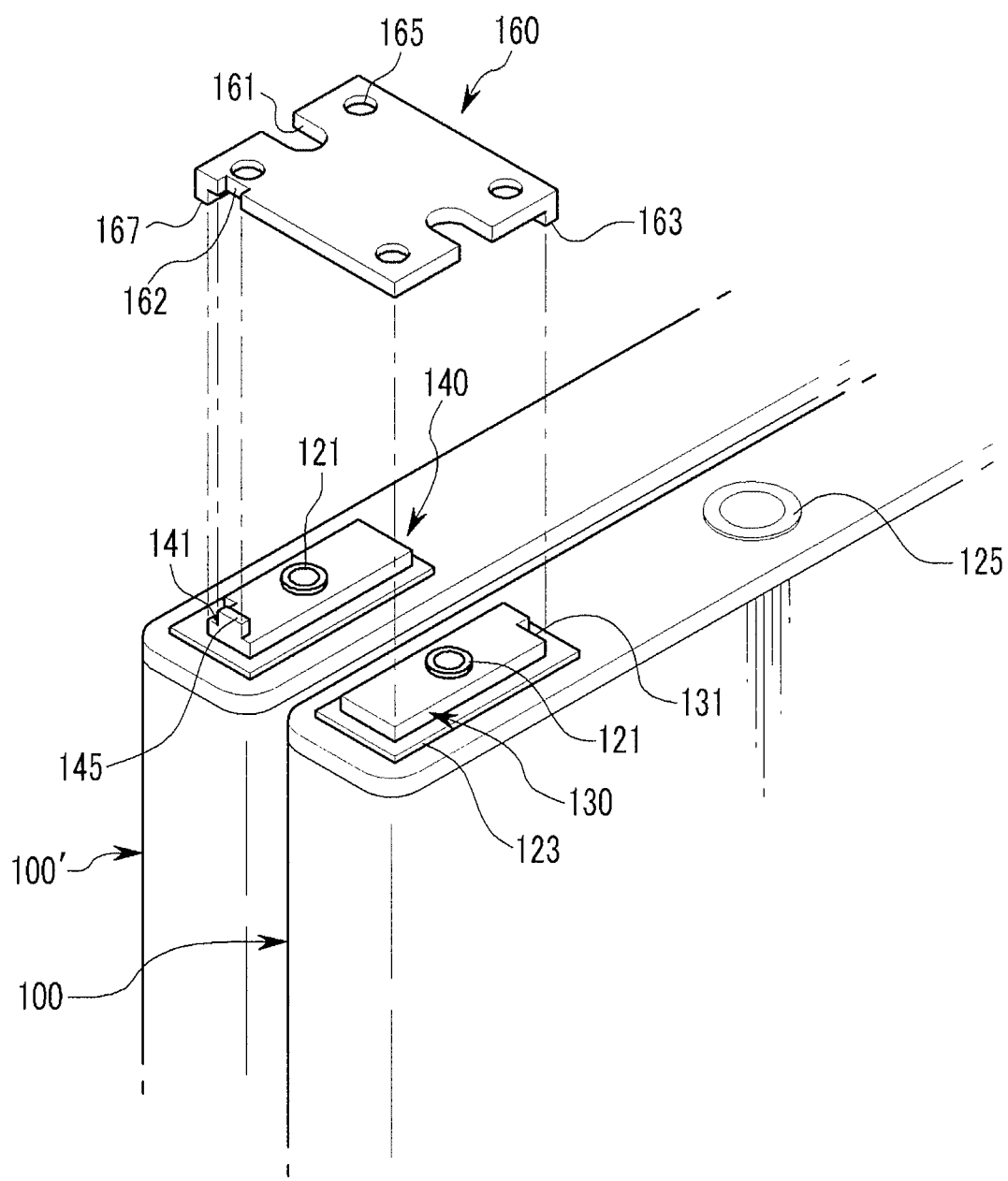
FIG. 3 is an exploded perspective view for illustrating a process of forming a battery module by electrically connecting rechargeable batteries according to the first exemplary embodiment of the present invention.
Figure 4:
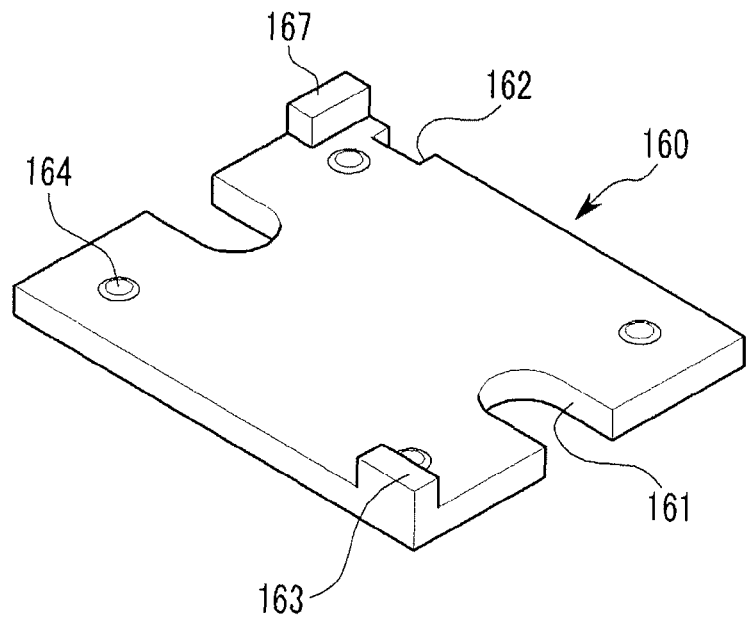
FIG. 4 is a bottom perspective view of a connection member according to the first exemplary embodiment of the present invention.
Figure 5:
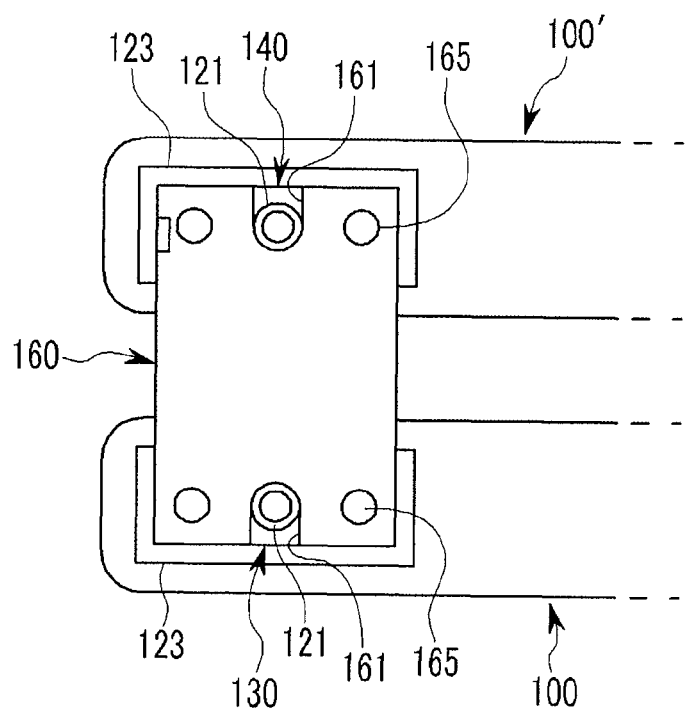
FIG. 5. is a plan view illustrating rechargeable batteries electrically connected to each other by a connection member.

FIG. 3 is an exploded perspective view for illustrating a process of forming a battery module by electrically connecting rechargeable batteries according to embodiments of the present invention. FIG. 4 is a bottom perspective view of a connection member according to a first exemplary embodiment of the present invention. FIG. 5. is a plan view illustrating rechargeable batteries electrically connected to each other by a connection member.

Referring to FIGS. 3, 4, and 5, the battery module according to embodiments of the present invention, is formed by connecting rechargeable batteries 100 and 100' to each other in series. However, the present invention is not limited thereto.

When the second terminal 130 of the rechargeable battery 100 is disposed adjacent to the first terminal 140 of the rechargeable battery 100' by an interval (e.g., by a predetermined distance), a connection member 160 is installed between the first terminal 140 and the second terminal 130. The connection member 160 has a substantially plate shape and includes verification portions that fit the indentations 131 and 141 and the protruding portion 145.

In the embodiments of the present invention, the verification portion is formed of an indentation (e.g., a groove) or a protrusion. The verification portion includes a first connection protrusion 167 that fits in the first indentation 141 of the first terminal 140, a first connection groove 162 that fits in the protruding portion 145 of the first terminal 140, and a second connection protrusion 163 that fits in the indentation 131 of the second terminal 130.

The first connection protrusion 167 has a shape corresponding to the first indentation 141 of the first terminal 140 and the first connection groove 162 has a shape corresponding to the protruding portion 145 of the first terminal 140. Further, the second connection 163 has a shape corresponding to the indentation 131 of the second terminal 130.

As such, when the connection member has the verification portions and the terminals have the corresponding indentations 131 and 141 or protruding portion 145, the connection member 160 is not joined to the terminal when a pair of positive terminals or a pair of negative terminals are arranged adjacently, thereby preventing misjoining.

It is important to prevent misjoining, when the connection member is fixed to the terminals by welding as described in embodiments of the present invention. This is because in a conventional battery module, the connection member may be rejoined by releasing the nut at the time of fixing the connection member by using the nut, but according to embodiments of the present invention, it is very difficult to disjoin the connection member after fixing the connection member to the terminals by welding.

Cut outs 161, shaped to insert the head portions of the rivet 121, are formed at both sides of the connection member 160. Grooves 165 are formed on the top of the connection member 160 so as to allow room for welding.

Further, contact protrusions 164 are formed on the bottom of the connection member 160, and are in contact with the top of the terminal at the time of the welding. Heat is concentrated on the contact protrusions 164 to melt the contact protrusions 164, such that it is possible to more easily weld the connection member 160 to the terminals 130 and 140.

Figure 6:
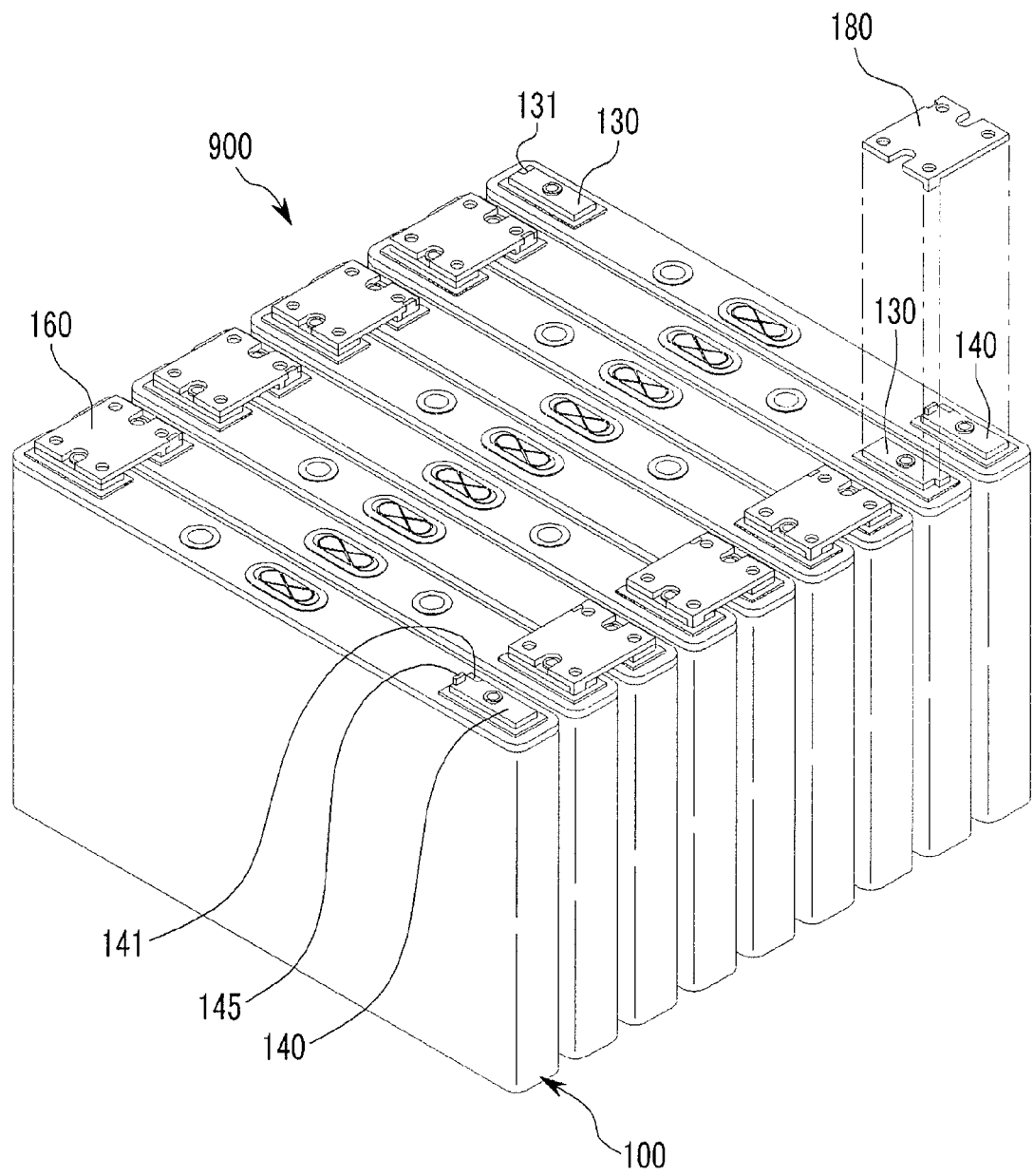
FIG. 6 is a perspective view of a battery module according to the first exemplary embodiment of the present invention.

FIG. 6 is a perspective view of a battery module according to a first exemplary embodiment of the present invention.

Referring to FIG. 6, the battery module 900 according to the first exemplary embodiment of the present invention includes rechargeable batteries 100 and connection members 160 and 180 that electrically connect the rechargeable batteries 100. The rechargeable batteries 100 that are arranged side by side are connected with each other in series by the connection members 160 and 180. The connection members 160 and 180 are connected to the terminals 130 and 140 by welding first terminals 140 and second terminals 130 of adjacent rechargeable batteries 100, which are disposed adjacent to each other.

The battery module 900 according to the present exemplary embodiment prevents a positive terminal and a negative terminal from being confused in installing the connection members 160 and 180 by including positions and shapes of indentations 131 and 141 and protruding portions 145 of the first terminal 140 and the second terminal 130 which are different from each other.

The connection member includes the first connection member 160 and the second connection member 180. The first connection member 160 is installed at a left side (see FIG. 6) of the battery module 900 and the second connection member 180 is installed at a right side of the battery module 900. Connection protrusions that fit the first indentation 141 formed in the first terminal 140 and the second indentation 131 formed in the second terminal 130 and a connection groove that fits in the protruding portion 145 of the first terminal 140 are formed in each of the connection members 160 and 180. However, the connection protrusions and the connection groove of the connection members 160 and 180 are installed at positions different from each other.

The battery module 900 according to the present exemplary embodiment has improved assemblability and prevents or reduces contact resistance between the connection members 160 and 180 and the terminals 130 and 140 from being increased by external vibration or shock by fixing the connection members 160 and 180 to the terminals 130 and 140 by welding. Further, since verification portions fit in the indentations 131 and 141 and the protruding portion 145, the verification portions support the connection members 160 and 180, thereby preventing the connection member 160 and 180 from being wobbled in the terminals 130 and 140. Accordingly, the contact resistance decreases, such that the output of the battery module is improved and the lifespan of the rechargeable battery is extended.

Figure 7:
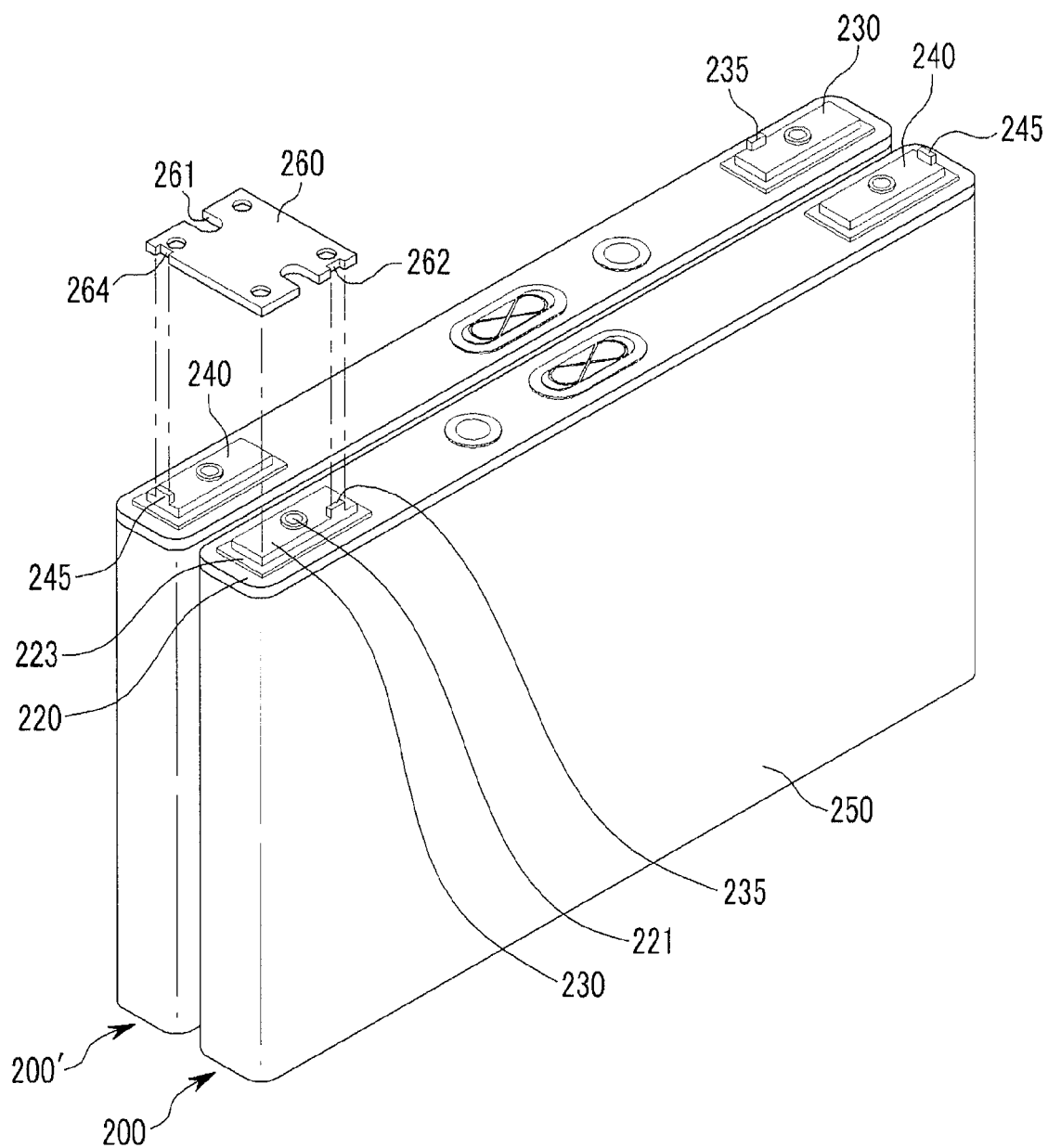
FIG. 7 is an exploded perspective view of a battery module according to a second exemplary embodiment of the present invention.

FIG. 7 is an exploded perspective view of a battery module according to a second exemplary embodiment of the present invention.

Referring to FIG. 7, the battery module according to the present exemplary embodiment includes a plurality of rechargeable batteries 200 and 200' and connection members 260 that electrically connect the rechargeable batteries 200 and 200'. Further, the rechargeable battery 200 includes a case 250, a cap plate 220 joined to the case 250, and first and second terminals 240 and 230 that protrude outward from the cap plate 220. The first and second terminals 240 and 230 have a plate shape. The first and second terminals 240 and 230 are fixed to the cap plate 220 by a rivet 221 with a terminal insulating member 223 interposed between the first and second terminals 240 and 230 and the cap plate 220.

The terminals 230 and 240 have a substantially rectangular plate shape. The rectangular shape has a short side having the comparatively shorter length and a long side having a longer length than the short side. A first protruding portion 245 protrudes upward at one edge of the short side of the first terminal 240 and a second protruding portion 235 protrudes upward at one edge of the long side of the second terminal 230. The first protruding portion 245 serves as a differentiation portion that differentiates the first terminal and second terminal from each other.

According to embodiments of the present invention, although protruding portions 245 and 235 are formed respectively at the first terminal 240 and the second terminal 230, it is possible to differentiate a positive terminal and a negative terminal from each other by forming the protruding portions 245 and 235 at positions which are different from each other.

Cut outs 261, shaped to insert the rivet 221, are formed at both sides of the connection member 260. Verification portions in which the first protruding portion 245 and the second protruding portion 235 fit are formed on the connection member 260.

The verification portion includes a first connection groove 264 which can be engaged with the first protruding portion 245 and a second connection groove 262 which can be engaged with the second protruding portion 235. The connection grooves 262 and 264 extend from the bottom to the top of the connection member 260. Therefore, it is possible to join the connection member 260 with each of the terminals 230 and 240 by determining positions of the connection grooves 262 and 264 with relative ease at the time of installing the connection member 260 in each of the terminals 230 and 240.

In the present exemplary embodiment, because the protruding portions 245 and 235 formed in the first and second terminals 240 and 230 are installed in different positions and the verification portions that fit in the protruding portions 235 and 245 are formed in the connection member 260, it is possible to prevent terminals having the same polarity from being misjoined.

Figure 8:
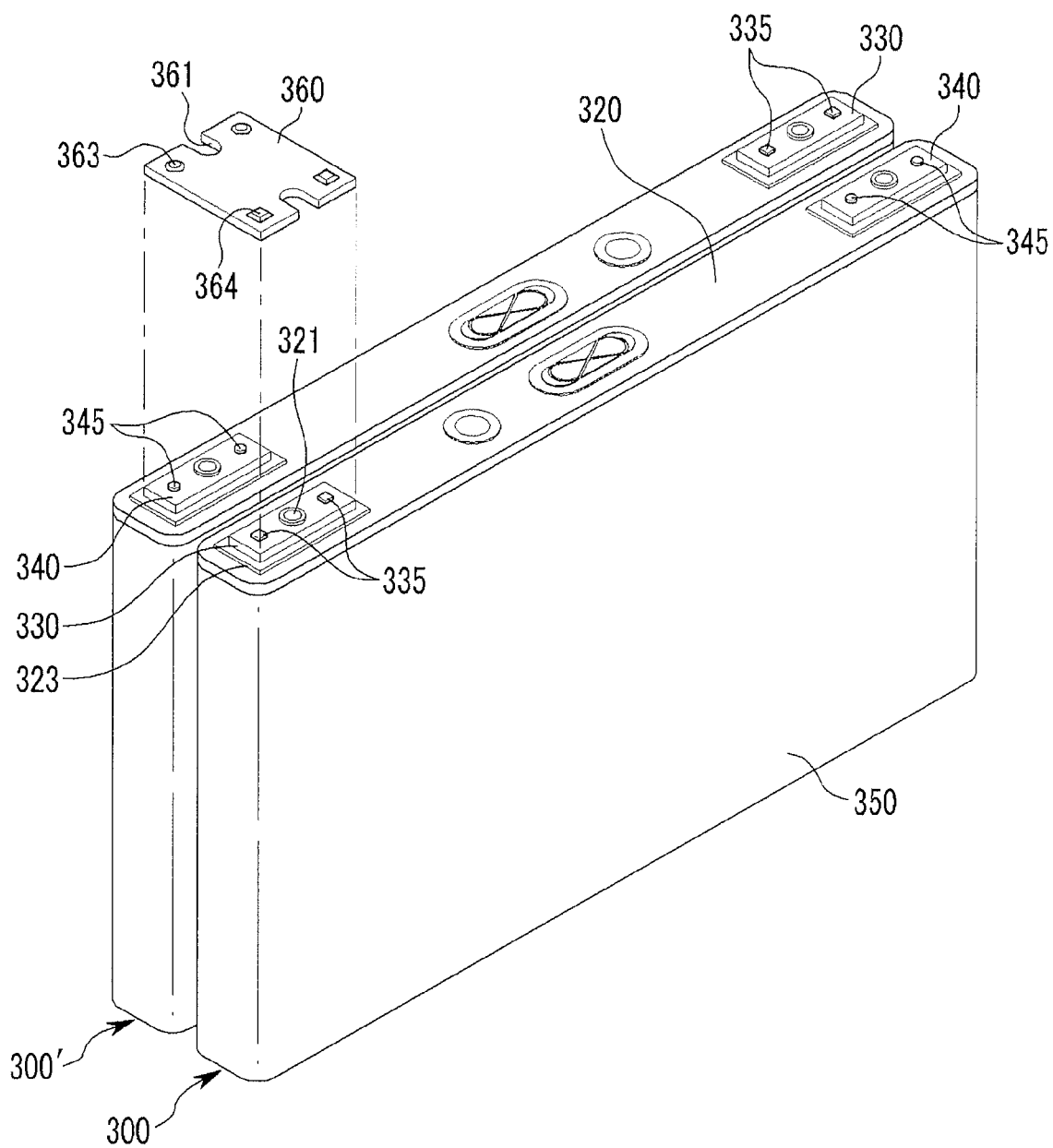
FIG. 8 is an exploded perspective view of a battery module according to a third exemplary embodiment of the present invention.
Figure 9:
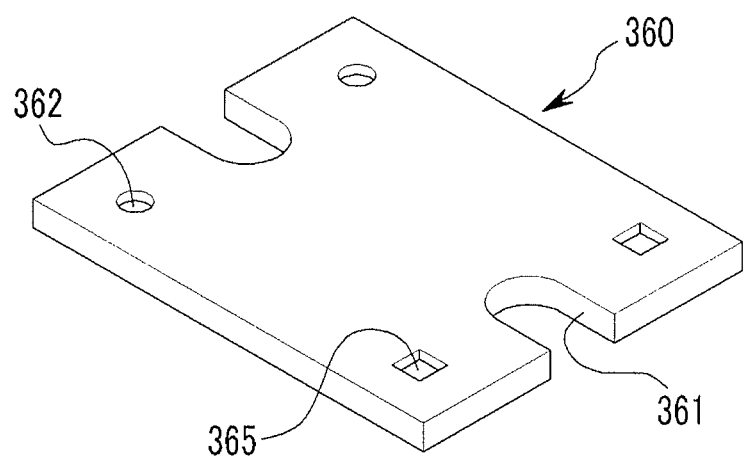
FIG. 9 is a perspective view of a connection member according to the third exemplary embodiment of the present invention.

FIG. 8 is an exploded perspective view of a battery module according to a third exemplary embodiment of the present invention. FIG. 9 is a perspective view of a connection member according to the third exemplary embodiment of the present invention.

Referring to FIGS. 8 and 9, the battery module according to the third exemplary embodiment includes a plurality of rechargeable batteries 300 and 300' and connection members 360 that electrically connect the rechargeable batteries.

Further, the rechargeable battery 300 includes a case 350, a cap plate 320 joined to the case 350, and first and second terminals 330 and 340 that protrude outward from the cap plate 320. The first and second terminals 330 and 340 have a plate shape. The first and second terminals 330 and 340 are fixed to the cap plate 320 by a rivet 321 with a terminal insulating member 323 interposed between the first and second terminals 330 and 340 and the cap plate 320.

The terminals 330 and 340 have a substantially rectangular plate shape. A first protruding portion 335 formed of a quadrangle protrusion is formed on the top of the first terminal 330 and a second protruding portion 345 formed of a circular protrusion is formed on the top of the second terminal 340. Thus, the first protruding portion 365 has a shape different from the second protruding portion 345, to constitute a differentiation portion.

When the protruding portions 335 and 345 having different shapes are formed in the first and second terminals 330 and 340, it is possible to easily differentiate a positive terminal and a negative terminal from each other depending on the shapes of the protruding portions 335 and 345 even if the protruding portions 335 and 345 are formed at the same position.

Cut outs 361, shaped to insert the rivet 321, are formed at both sides of the connection member 360. Verification portions including a quadrangle first connection groove 365 in which the first protruding portion 335 is inserted and a circular second connection groove 362 in which the second protruding portion 345 is inserted are formed at surfaces facing the terminals.

The connection members are fixed to the terminals by welding the connection grooves 362 and 365 to the protruding portions 335 and 345 where the protruding portions 335 and 345 fit in the connection grooves 362 and 365.

On the top (a surface opposite to a surface facing the terminal) of the connection member 360, a first indication portion 364 formed of a quadrangle protrusion is formed at an upper portion of a position where a quadrangle groove is formed and a second indication portion 363 formed of a circular protrusion is formed at an upper portion of a position where a circular groove is formed.

As such, when the indication portions are formed, it is possible to determine shapes and positions of the connection grooves 362 and 365 from the above, such that it is possible to join the connection grooves 362 and 365 and the protruding portions 335 and 345 by easily determining the connection grooves 362 and 365 which can be joined with the protruding portions 335 and 345.

Further, the first protruding portion 335 formed in the first terminal 330 and the second protruding portion 345 formed in the second terminal 340 have different shapes, thus the verification portions in which the protruding portions fit are formed in the connection member 360, so that it is possible to prevent terminals having the same polarity from being misjoined.

Figure 10:
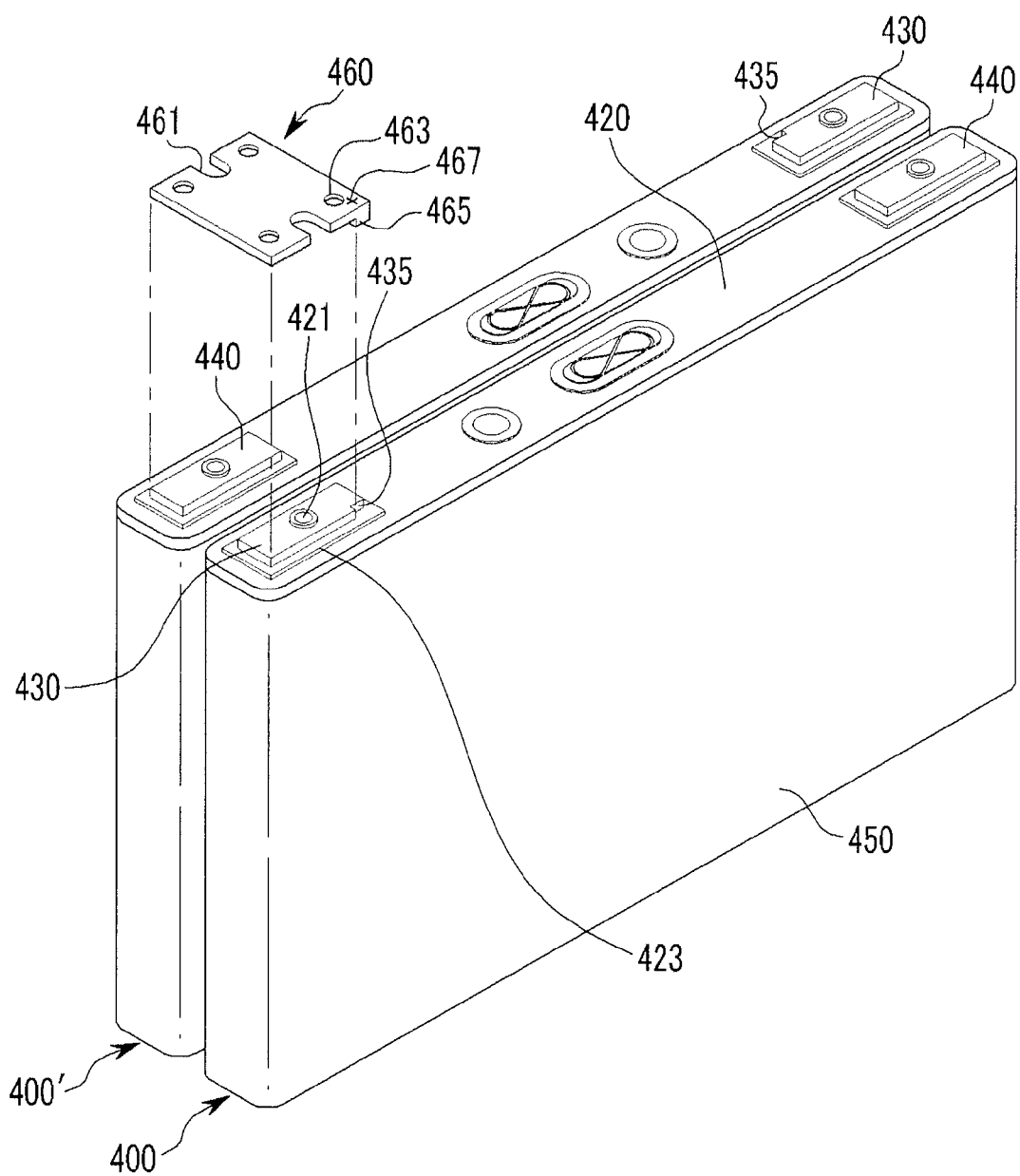
FIG. 10 is an exploded perspective view of a battery module according to a fourth exemplary embodiment of the present invention.

FIG. 10 is a perspective view of a battery module according to a fourth exemplary embodiment of the present invention.

Referring to FIG. 10, the battery module according to the fourth exemplary embodiment includes a plurality of rechargeable batteries 400 and 400' and connection members 460 that electrically connect the rechargeable batteries 400 and 400'. Further, the rechargeable battery 400 includes a case 450, a cap plate 420 joined to the case 450, and first and second terminals 430 and 440 that protrude outward from the cap plate 420. The first and second terminals 430 and 440 have a plate shape. The first and second terminals 430 and 440 are fixed to the cap plate 420 by a rivet 421 with a terminal insulating member 423 interposed between the first and second terminals 430 and 440 and the cap plate 420.

The rechargeable battery 400 is electrically connected with the adjacent rechargeable battery 400' through a connection member 460. The connection members 460 are fixed to the first terminal 430 and the second terminal 440 of adjacent rechargeable batteries by welding.

The terminals 430 and 440 have a substantially rectangular plate shape. An indentation 435 serving as a differentiation portion for differentiating the first terminal 430 from the second terminal 440 is formed at an edge of the first terminal 430. The second terminal 440 has a flat plate shape where no indentation and no protruding portion is formed.

Further, cut outs 461, shaped to insert the rivet 421, are formed at both sides of the connection member 460. A verification portion, formed of a connection protrusion 465 that fits in the indentation 435, is formed on a surface facing the terminal. The connection protrusion 465 is formed on the bottom of the connection member 460. An indication portion 467 that indicates a forming position of the connection protrusion 465 is formed on the top of a part where the connection protrusion 465 is formed. The indication portion 467 may be formed of a symbol. In fourth exemplary embodiment, the indication portion 467 is "+", but the present invention is not limited thereto. Therefore, the indication portion may be formed of a protrusion, a groove, a pattern, a symbol, a character, etc.

As such, when the indentation 435 is formed only in the first terminal 430, it is possible to easily differentiate a positive terminal and a negative terminal from each other depending on formation of the indentation 435. Therefore, it is possible to prevent terminals having the same polarity from being misjoined by forming the connection protrusion 465, that fits in the indentation 435, in the connection member 460.

Further, the indication portion 467 is formed on the top of the connection protrusion 465, such that it is possible to facilitate assembling by easily determining the position of the connection protrusion 465.

In assembling the battery module, when the indication portion 467 is not formed, positions of the protrusions must be checked one by one when joining the connection member 460, thus, assembling would be performed through a process of trial and error. As described in the fourth exemplary embodiment, when the indication portion 467 is formed, it is possible to perform assembling more quickly than the conventional method, such that productivity is improved.

Figure 11:
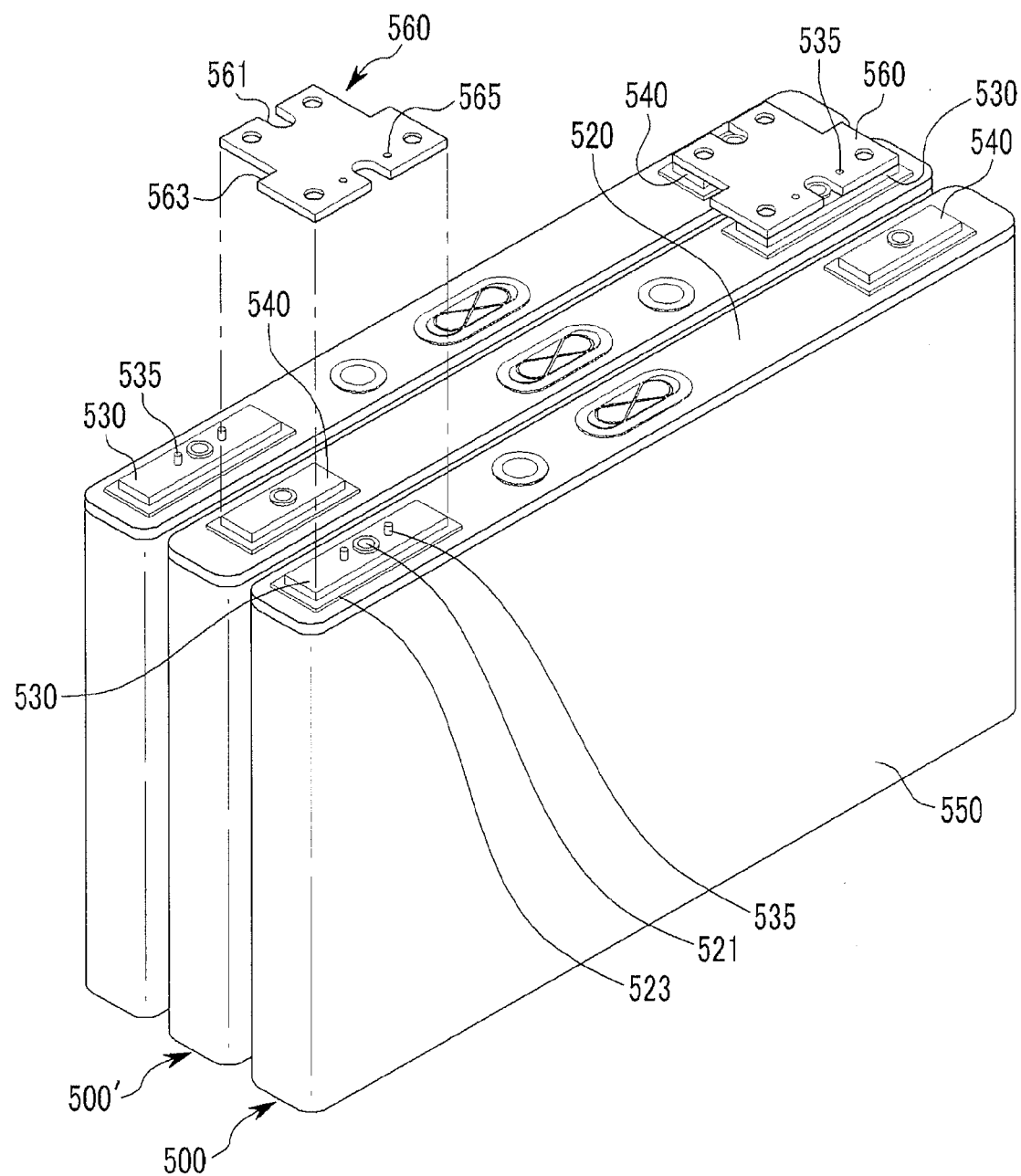
FIG. 11 is an exploded perspective view of a battery module according to a fifth exemplary embodiment of the present invention.

FIG. 11 is an exploded perspective view of a battery module according to a fifth exemplary embodiment of the present invention.

Referring to FIG. 11, the battery module according to the fifth exemplary embodiment includes a plurality of rechargeable batteries 500 and 500' and connection members 560 that electrically connect the rechargeable batteries 500 and 500'. Further, the rechargeable battery 500 includes a case 550, a cap plate 520 joined to the case 550, and first and second terminals 530 and 540 that protrude outward from the cap plate 520. The first and second terminals 530 and 540 have a plate shape. The first and second terminals 530 and 540 are fixed to the cap plate 520 by a rivet 521 with a terminal insulating member 523 interposed between the first and second terminals 530 and 540 and the cap plate 520.

The rechargeable battery 500 is electrically connected with the rechargeable battery 500' through connection members 560. The connection members 560 are fixed to the first terminal 530 and the second terminal 540 of the rechargeable batteries 500 and 500' by welding.

The terminals 530 and 540 have a substantially rectangular plate shape. A protruding portion 535 serving as a differentiation portion for differentiating the first terminal 530 from the second terminal 540 is formed on the top of the first terminal 530. The second terminal 540 has a flat plate shape where the protruding portion is not formed. The first terminal is longer than the second terminal.

The differentiation portion includes two protruding portions 535. The protruding portions 535 have a substantially cylindrical shape and vertically protrude toward the connection member 560 upward from the surface of the first terminal 530. The protruding portions 535 are spaced apart from each other with the rivet 521 interposed therebetween.

Further, cut outs 561, shaped to insert the rivet 521, are formed at both sides of the connection member 560. A verification portion, formed of a connection groove 565 in which the protruding portions 535 fit, is formed on a surface facing the terminal. The connection groove 565 passes through the connection member 560, thus, the connection groove 565 is also indicated on the top of the connection member 560.

As described in the present exemplary embodiment, when the protruding portions 535 are formed only in the first terminal 530, it is possible to easily differentiate a positive terminal and a negative terminal from each other. Further, when the connection groove 565 that fits in the protruding portions 535 is formed in the connection member 560, it is possible to prevent terminals having the same polarity from being misjoined.

Further, the two protruding portions 535 are spaced from each other with the rivet 521 interposed therebetween, such that it is possible to more stably support the connection member 560 against external shock or vibration. As a result, it is possible to prevent contact between the connection member 560 and the terminals 530 and 540 from being deteriorated.

Figure 12:
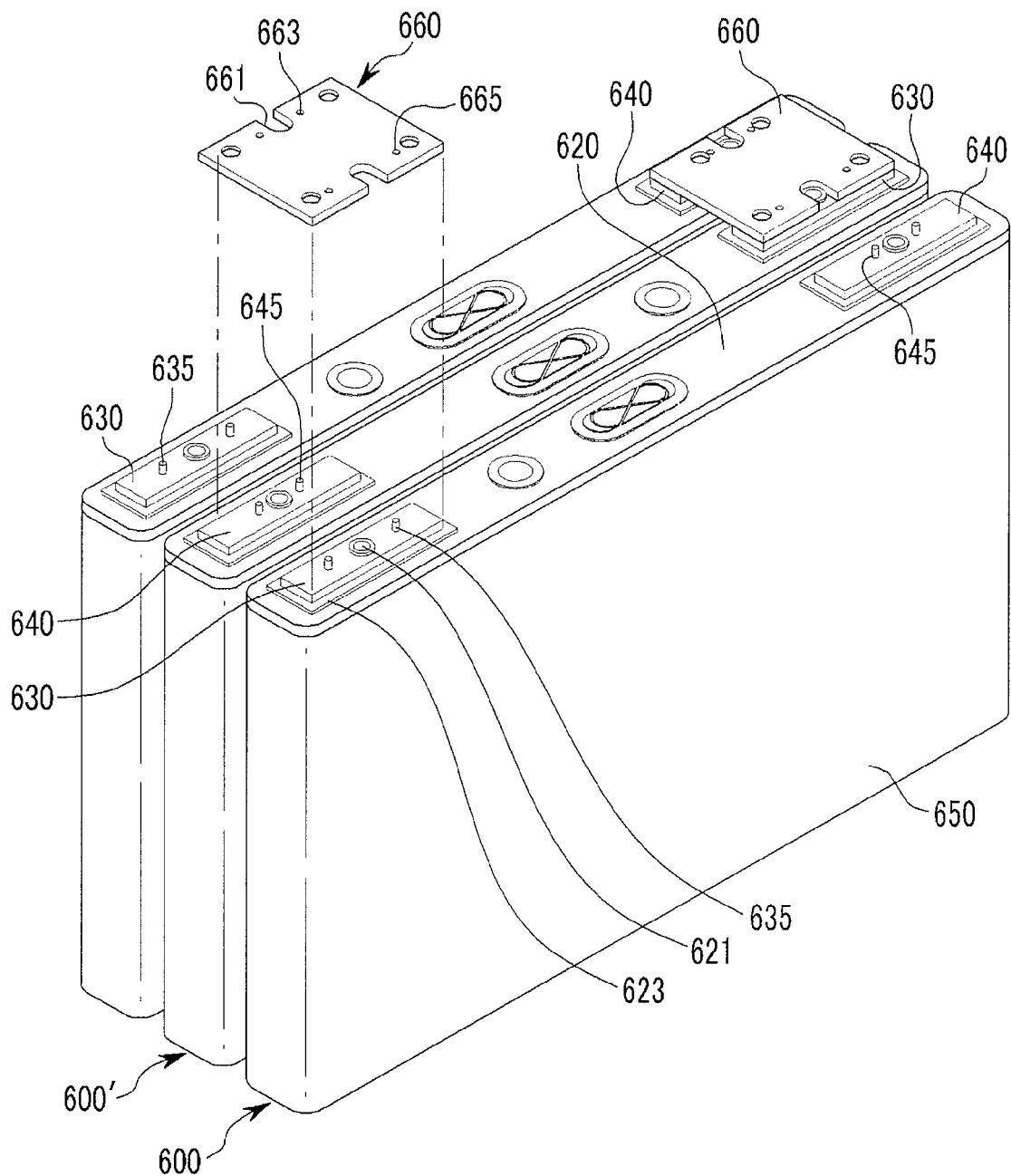
FIG. 12 is an exploded perspective view of a battery module according to a sixth exemplary embodiment of the present invention.

FIG. 12 is an exploded perspective view of a battery module according to a sixth exemplary embodiment of the present invention.

Referring to FIG. 12, the battery module according to the sixth exemplary embodiment includes a plurality of rechargeable batteries 600 and 600' and connection members 660 that electrically connect the rechargeable batteries 600 and 600'.

Further, the rechargeable battery 600 includes a case 650, a cap plate 620 joined to the case 650, and first and second terminals 630 and 640 that protrude outward from the cap plate 620. The first and second terminals 630 and 640 have a plate shape. The first and second terminals 630 and 640 are fixed to the cap plate 620 by a rivet 621 with a terminal insulating member 623 interposed between the first and second terminals 630 and 640 and the cap plate 620.

The rechargeable battery 600 is electrically connected with the rechargeable battery 600' adjacent thereto through connection members 660. The connection members 660 are fixed to the first terminal 630 and the second terminal 640 of the adjacent rechargeable batteries 600 and 600' by welding.

The terminals 630 and 640 have a substantially rectangular plate shape. First protruding portions 635, serving as a differentiation portion for differentiating the first terminal 630 from the second terminal 640 are formed on the top of the first terminal 630. Second protruding portions 645 are formed on the top of the second terminal at positions different from the first protruding portions 635.

The differentiation portion is includes two first protruding portions 635. The first protruding portions 635 have a substantially cylindrical shape and vertically protrude toward the connection member 660, upward from the surface of the first terminal 630. The protruding portions 635 are spaced from each other with the rivet 621 interposed therebetween. Further, the second protruding portions 645 also have a substantially cylindrical shape, but the first protruding portions 635 and the second protruding portions 645 are formed at different positions. That is, a distance between the first protruding portions 635 is greater than a distance between the second protruding portions 645.

Further, cut outs 661, shaped to insert the rivet 621, are formed at both sides of the connection member 660. A verification portion, formed of connection grooves 665 in which the protruding portions 635 fit, is formed on a surface facing the terminal. Second connection grooves 663 in which the second protruding portions 645 fit are formed in the connection member 660.

Figure 13:
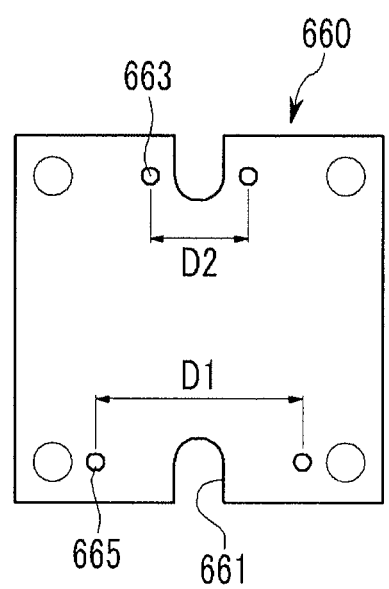
FIG. 13 is a plan view of a connection member according to the sixth exemplary embodiment of the present invention.

As shown in FIG. 13, since the distance between the first protruding portions is different from the distance between the second protruding portions, a distance D1 between the first connection grooves 665 is longer than a distance D2 between the second connection grooves 663.

As such, since the distances between the protruding portions 635 and 645 and the distances between the connection grooves 663 and 665, in which the protruding portions 635 and 645 fit are different from each other, it is possible to prevent terminals having the same polarity from being misjoined.

Further, since the protruding portions 635 and 645 of the first and second terminals 630 and 640 fit in the connection grooves 663 and 665 of the connection members 660, the connection members 660 can be stably supported.

Figure 14:
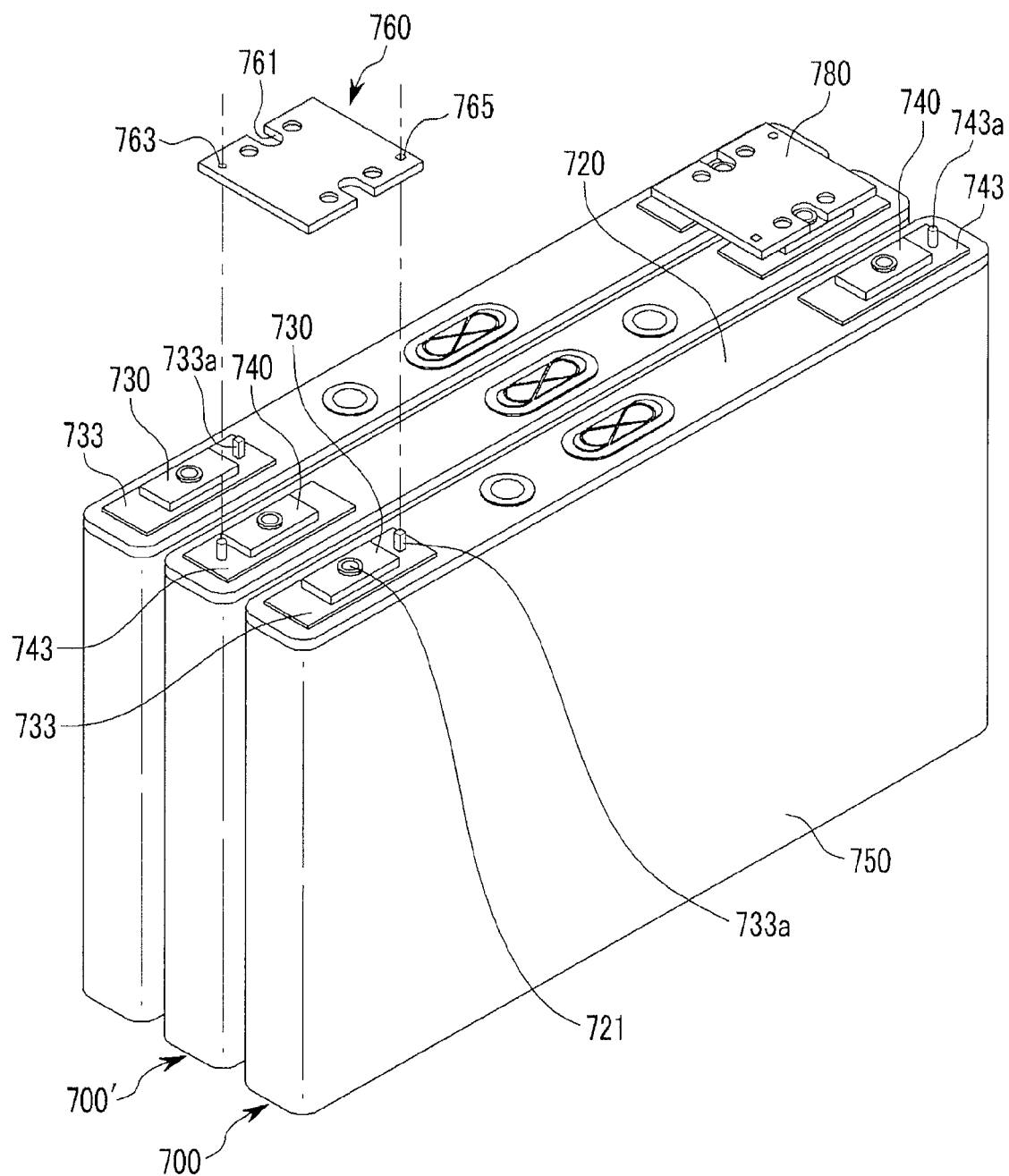
FIG. 14 is an exploded perspective view of a battery module according to a seventh exemplary embodiment of the present invention.

FIG. 14 is an exploded perspective view of a battery module according to a seventh exemplary embodiment of the present invention.

Referring to FIG. 14, the battery module according to the seventh exemplary embodiment includes a plurality of rechargeable batteries 700 and 700' and connection members 760 that electrically connect the rechargeable batteries 700 and 700'.

Further, the rechargeable battery 700 includes a case 750, a cap plate 720 joined to the case 750, and first and second terminals 730 and 740 that protrude outward from the cap plate 720. The first and second terminals 730 and 740 have a plate shape. The first and second terminals 730 and 740 are fixed to the cap plate 720 by a rivet 721.

The rechargeable battery 700 is electrically connected with the rechargeable battery 700' adjacent thereto through connection members 760. The connection members 760 are fixed to the first terminal 730 and the second terminal 740 of the adjacent rechargeable batteries 700 and 700' by welding.

The terminals 730 and 740 have a substantially rectangular plate shape. A first terminal insulating member 733 for insulation is installed between the first terminal 730 and the cap plate 720 and a second terminal insulating member 743 for insulation is installed between the second terminal 740 and the cap plate 720.

The terminal insulating members 733 and 743 has a wider area than the terminals 730 and 740, such that the tops of the terminal insulating members 733 and 743 occupy an area larger than the terminals 730 and 740. Further, a first protruding portion 733a serving as a differentiation portion for differentiating the first terminal 730 from the second terminal 740 is formed on the top of the first terminal insulating member 733, such that the first protruding portion 733a extends upward, beyond the top of the first terminal.

A second protruding portion 743a having a shape different from the first protruding portion 733a is formed on the top of the second terminal insulating member 743. The first protruding portion 733a has a quadrangle pole shape that protrudes vertically from the top of the first terminal insulating member 733 and the second protruding portion 743a has a cylindrical shape that protrudes vertically from the top of the second terminal insulating member 743.

Further, the first protruding portion 733a is formed on a side of the first terminal 730 and the second protruding portion 743a is formed on a different side of the second terminal 740. As such, the first protruding portion 733a and the second protruding portion 743a are formed at different positions, such that the first terminal 730 and the second terminal 740 can be easily differentiated from each other.

In FIG. 14, the differentiation portion formed of the protruding portion is formed in the first terminal insulating member 733, but the present invention is not limited thereto and the differentiation portion may be formed of an indentation. Further, in the present exemplary embodiment, the protruding portions are formed in both the first terminal insulating member 733 and the second terminal insulating member 743, but the present invention is not limited thereto. In addition, in the present exemplary embodiment, the protruding portion may be formed in the first terminal insulating member and an indentation may be formed in the second terminal insulating member, or nothing may be formed in the second terminal insulating member.

Meanwhile, cut outs 761, shaped to insert the rivet 721, are formed at both sides of the connection member 760. A verification portion, formed of first connection grooves 765 in which the protruding portions 733a fit, is formed on a surface facing the terminal. Further, second connection grooves 763 in which the second protruding portions 743a fit are formed in the connection member 760.

As such, the differentiation portion for differentiating the first terminal 730 and the second terminal 740 from each other is formed in the first terminal insulating member 733, such that it is possible to easily differentiate the first terminal 730 and the second terminal 740 from each other. Thus, it is possible to prevent terminals having the same polarity from being misjoined.

Further, since the protruding portions 733a and 743a of the first and second terminal insulating members 733 and 743 fit in the connection grooves 765 and 763 of the connection member 760, the connection members 760 can be stably supported.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module, comprising:
a plurality of rechargeable batteries, each comprising a first terminal and a second terminal at a same side of the rechargeable batteries, the first terminal including at least one differentiation portion comprising at least one of an indentation or a protruding portion, to differentiate the first terminal from the second terminal; and
connection members electrically connecting the plurality of rechargeable batteries, each of the connection members being fixed to the first terminal of a first one of the plurality of rechargeable batteries and the second terminal of a second one of the plurality of rechargeable batteries adjacent to the first one, the connection members comprising verification portions which fit the differentiation portions, the connection members being configured to be combined with the first terminal of the first one of the plurality of the rechargeable batteries and the second terminal of the second one of the plurality of the rechargeable batteries adjacent to the first one in a direction perpendicular to a top surface of the first terminal of the first one of the plurality of the rechargeable batteries and the second terminal of the second one of the plurality of the rechargeable batteries adjacent to the first one, wherein the first terminal of the first one of the plurality of the rechargeable batteries, the second terminal of the second one of the plurality of the rechargeable batteries adjacent to the first one, and the connection member are configured to space the first one of the plurality of the rechargeable batteries and the second terminal of the second one of the plurality of batteries adjacent to the first one at a set distance, wherein each of the first and second terminals comprises a plate, wherein the at least one of the indentation portions is formed on the plate, or at least one of the protruding portions extends from the plate, and wherein each of the rechargeable batteries comprises:
an electrode assembly;
a case containing the electrode assembly;
a cap plate coupled to an opening of the case; and
a rivet fixing the first terminal or the second terminal to the cap plate.

2. The battery module of claim 1, wherein:
each of the rechargeable batteries further comprises:
the electrode assembly comprising a positive electrode, a negative electrode, and a separator between the positive electrode and the negative electrode.

3. The battery module of claim 1, wherein:
each of the rechargeable batteries further comprises a lead member electrically connecting the first terminal or the second terminal to the electrode assembly, and
the rivet fixes the lead member to the cap plate together with the first terminal or the second terminal.

4. The battery module of claim 1, wherein:
the first terminal includes the differentiation portion and no indentations or protruding portions are at the second terminal.

5. The battery module of claim 1, wherein:
each of the connection members has at least one contact protrusion at a surface facing the first terminal or the second terminal, and the connection member is joined to the first terminal or the second terminal at the contact protrusion by welding.

6. The battery module of claim 1, wherein:
the first terminal has a differentiation portion comprising a first indentation, the second terminal has a second indentation, and the first indentation has a position or a shape at the first terminal different from a position or a shape of the second indentation at the second terminal.

7. The battery module of claim 1, wherein:
the first terminal has a differentiation portion comprising a first protruding portion, the second terminal has a second protruding portion, and the first protruding portion has a position or a shape at the first terminal different from a position or a shape of the second protruding portion at the second terminal.

8. The battery module of claim 1, wherein:
the first terminal has a differentiation portion comprising a protruding portion, the second terminal has an indentation, and the verification portions fit the protruding portion and the indentation.

9. The battery module of claim 1, wherein:
the first terminal has differentiation portions comprising first protruding portions, the second terminal has second protruding portions, and a distance between the first protruding portions is different from a distance between the second protruding portions.

10. The battery module of claim 1, wherein:
each of the connection members has indication portions that indicate positions or shapes of the verification portions at a surface opposite to a surface where the verification portions are located.

11. The battery module of claim 10, wherein:
the indication portions are selected from the group consisting of a protrusion, a groove, a pattern, a symbol, and a character.

12. The battery module of claim 10, wherein:
the indication portions have a same shape as the differentiation portions.

13. The battery module of claim 1, wherein:
one of the connection members is fixed by welding to the first terminal of the first one of the plurality of the rechargeable batteries and the second terminal of the second one of the plurality of the rechargeable batteries adjacent to the first one,
the at least one differentiation portion comprises a first protruding portion at a top of the first terminal, a second protruding portion at a top of the second terminal, and the second protruding portion has a shape different from the first protruding portion,
the verification portion comprises connection grooves in which the first protruding portion and the second protruding portion fit, and
the first protruding portion and the verification portion and the second protruding portion and the verification portion are joined to each other by welding.

14. The battery module of claim 1, wherein:
each of the first and second terminals has a substantially rectangular plate shape.

15. The battery module of claim 1, wherein:
the at least one differentiation portion is at a periphery of the first terminal.

* * * * *